Patented May 9, 1950

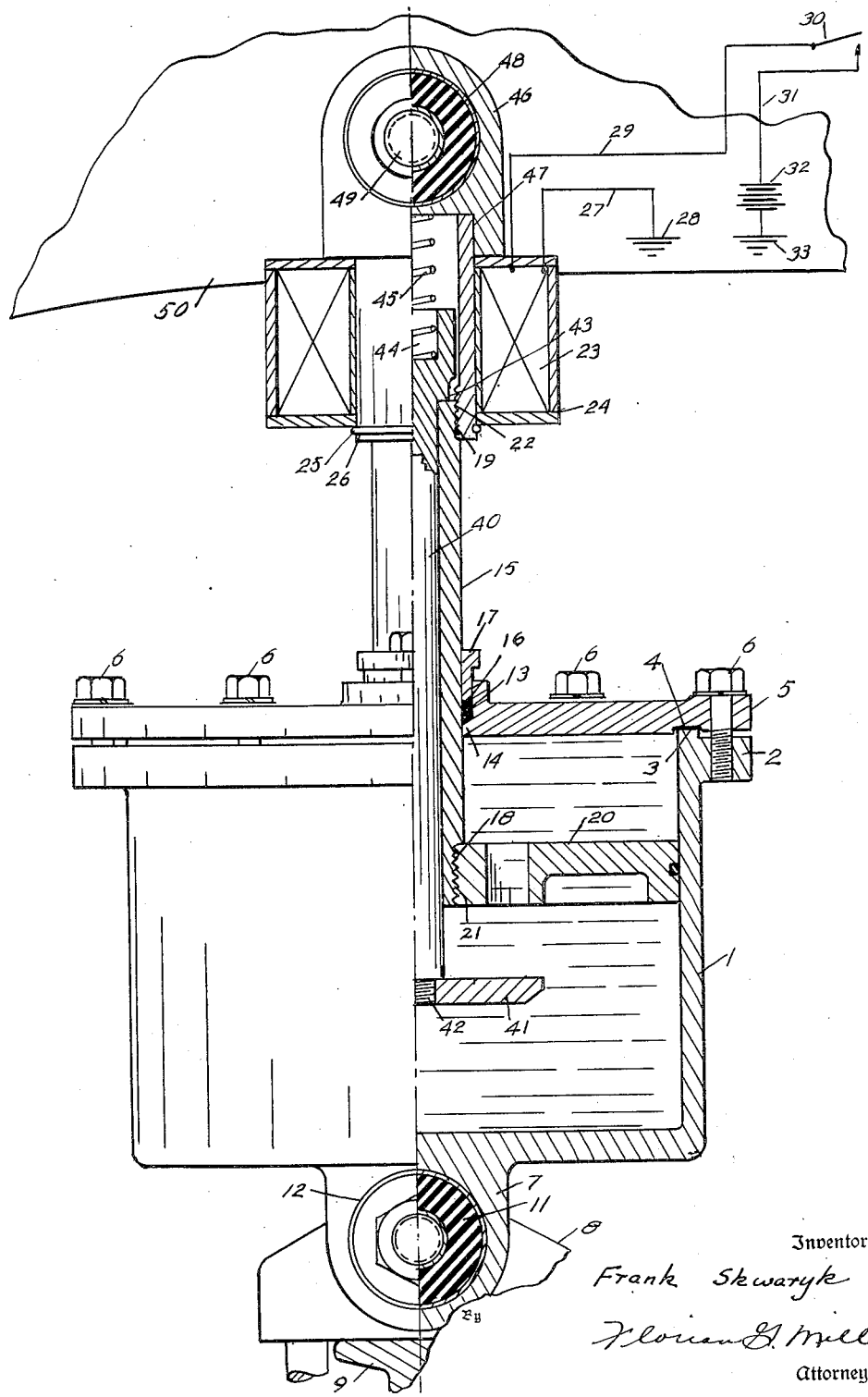

2,507,276

UNITED STATES PATENT OFFICE 2,507,276

STABILIZING DEVICE

Frank Skwaryk, Erie, Pa.

Application December 17, 1947, Serial No. 792,287

5 Claims. (Cl. 188—88)

1

This invention relates generally to stabilizing devices and more particularly to a device to prevent the front end of an automobile or other motor vehicle from moving downwardly when the brakes of the vehicle are applied suddenly with great force.

In the average motor vehicle, the front bumper is generally a slight distance lower than the rear bumper. It has been found that when a motor vehicle is moving at comparatively high speed and it is necessary to apply great force to the brakes suddenly to prevent the impact with a vehicle ahead, the front end of the motor vehicle on which the brakes are applied moves downwardly wherein the bumper of the moving vehicle moves under the bumper of the stalled or slowly moving vehicle with the result that the entire front fenders and grill of the moving vehicle are damaged.

It is, accordingly, an object of my invention to provide means for preventing the front end of a vehicle from moving downwardly when the brakes of the vehicle are appplied suddenly with great force which is simple in construction, economical in cost, economical in manufacture and easy to install.

Another object of my invention is to provide a stabilizing device for the front end of a motor vehicle with the motor in the forward end thereof, which permits free springing vertical movement of the vehicle under normal conditions but which stabilizes the frame of the vehicle upon sudden stopping thereof.

Other objects of my invention will become evident from the following detailed description, taken in conjunction with the accompanying drawings, in which The figure shows a side elevational view of my novel stabilizing device attached to the side member of a motor vehicle frame and a side member of the under frame of a motor vehicle, one side thereof being broken away.

Referring now to the drawings, I show in the figure of the drawing a cup-shaped cylindrical member 1 having an outwardly directed flanged portion 2 and annular seating portion 3 for receiving the annular grooved seating portion 4 of a cover member 5. Screw bolts 6 secure the cover member 5 to the cylinder 1. The cylinder 1 has a depending, apertured, semi-cylindrical shaped projection 7 attached to a bracket 8 which in turn is secured to side member 9 of the under frame of a motor vehicle. A cylindrical shaped yieldable member 11 is disposed in the aperture 12 of the projection 7 to provide a yieldable connection between the cylinder 1 and the side 9 of the "A"

2 frame or underframe of the motor vehicle. The cover member 5 has a centrally disposed aperture 13 with an inwardly directed portion 14 for engaging the outer side of a hollow sleeve 15 which reciprocates in the aperture 13 of the cover 5. Suitable sealing material 16 is disposed between the sleeve 15 and the aperture 13 and is forced into sealing relationship with the outer side of the sleeve 15 by gland member 17. The sleeve 15 has threaded portions 18 and 19 on the ends thereof, the internally threaded portion 21 of apertured piston 20 movable in the cylinder 1 being threadably engaged with the threaded portion 18 of the sleeve 15 and internally threaded sleeve 22 being threadably engaged with the threaded end 19 of the sleeve 15. A conventional solenoid 23 is disposed in cylindrical casing 24 which surrounds the sleeve 22. A spring clip 25 engages peripheral groove 26 in the sleeve 22 to hold the cylindrical casing 24 in position on the outer side of the sleeve 22. A wire 27 is connected to a ground 28 and to the solenoid 23 and a wire 29 is connected to the solenoid 23 which completes a circuit with wire 27 when the switch 30 is closed through wire 31, battery 32 and ground 33.

The switch 30 may be disposed adjacent a brake lever (not shown) or any other suitable conventional actuating lever or device so that it will be operated to energize the solenoid 23 when the brake lever or any other actuating lever or device is moved to an operative position.

Shaft 40 is telescopically disposed in the sleeve 15 and it has a disc shaped valve member 41 secured to the bottom end thereof in the cylinder 1 by a screw member 42. The upper end of the shaft 40 is flanged outwardly at 43 to form a shoulder to limit the downward movement of the shaft 40 by engagement with the upper end of the sleeve 15. The upper end of the shaft 40 has a bore 44 provided therein for nesting a spring 45 which urges the shoulder 43 of the shaft 40 into engagement with the upper end of the sleeve 15. Cap member 46 has a cylindrical bore 47 for mounting on the upper end of the sleeve 22. The upper end of the spring 45 abuts against the cap member 46. The cap member 46 has a comparatively heavy cylindrical shaped yieldable snubbing portion 48 therein through which extends a shackle bolt 49 which in turn passes through the side frame member 50 of a motor vehicle.

In operation, the cap member 46 and projection 7 are connected to side frame member 50 and bracket 8 respectively, the bracket 8 in turn being secured to the side frame member 9 of the lower frame of a motor vehicle. The piston 20 is then disposed in the cylinder 1, the cover member 5 is secured on the cylinder 1, and it is then filled with a suitable liquid. In the normal operation of the vehicle when the switch 30 is in inoperative position, the piston 20 is free to move up and down in the cylindrical member 1 thereby permitting relative movement between the cylinder 1 and the side frame member 50. When the actuating lever such as the brake lever of a motor vehicle or any other conventional actuating lever or device associated with the switch 30 is actuated, the switch 30 is automatically closed and solenoid 23 is energized by a circuit consisting of wire 29, switch 30, wire 31, battery 32, ground 33 to ground 28 and wire 27 to solenoid 23. The energization of the solenoid 23 causes the shaft 40 to move upwardly against the force of the spring 45 thereby causing the valve member 41 to move into sealing engagement with the apertures in the piston 20. With the apertures in the piston 20 closed, the piston 20 will be held against movement in the cylinder 1 by the fluid therein, thereby preventing relative movement between the cylinder 1 and the side frame member 50 of the vehicle. Since there is no relative movement between the parts of my novel device when the apertures in the piston 20 are closed, there will be substantially no relative movement between the side frame member 9 of the lower frame and the side frame member 50 of the chassis of the automobile.

It will be evident from the foregoing description that I have provided a novel device for stabilizing the horizontal position of the frame of a motor vehicle when the motor vehicle is stopped suddenly to prevent the lowering of the front bumper of the motor vehicle and thereby permitting a bumper to bumper contact between colliding vehicles to minimize damages thereto.

Various changes may be made in the specific embodiment of my invention without departing from the spirit thereof or from the scope of the appended claims.

What I claim is:

1. A stabilizing device for the frame of a motor vehicle having an underframe movable relative to said frame, comprising a cylinder, means for attaching said cylinder to one of the relatively moving frames, fluid in said cylinder, an apertured piston movable in said cylinder under normal conditions, said fluid being disposed on both sides of said piston, a sleeve connected to said piston attached to the other relatively movable frame, a slidable shaft freely movable in said sleeve, a valve movable in said cylinder and secured to the end of said shaft adapted to sealingly engage the apertures in said piston, and electrical means for moving said valve in sealing relationship with the apertures in said piston upon energization thereof.

2. A stabilizing device as set forth in claim 1 wherein said electrical means comprises a solenoid surrounding said valve shaft, a source of electrical energy, a circuit connecting said solenoid and said source of electrical energy, and an electrical switch in said circuit.

3. A stabilizing device as set forth in claim 1 wherein spring means are provided for moving said valve member on said valve shaft away from said apertured piston.

4. A stabilizing device of the type described for attachment to and disposal between two relatively movable members comprising a cup-shaped cylinder, an apertured cover for said cylinder, a sleeve extending through said apertured cover, an apertured piston movable in said cylinder attached to said sleeve, fluid substantially filling said cylinder disposed on both sides of said piston, a valve shaft telescopically disposed in said sleeve, a valve on the lower end of said valve shaft adapted to sealingly engage the apertures in said piston, a solenoid surrounding the upper end of said valve shaft, a spring for urging the valve on the end of said valve shaft away from said piston, means on said cylinder and said sleeve for attaching them respectively to said two relatively movable members, a source of electrical energy, a circuit connecting said source of electrical energy to said solenoid, and a switch in said circuit.

5. A stabilizing device of the type described as set forth in claim 4 wherein the upper end of said valve shaft is enlarged to engage the upper end of said sleeve to limit the movement thereof in one direction.

FRANK SKWARYK.

REFERENCES CITED

The following references are of record in the file of this patent:

UNITED STATES PATENTS

| Number | Name | Date |
|---|---|---|
| 1,205,433 | Christman | Nov. 21, 1916 |
| 1,948,185 | Padgett | Feb. 20, 1934 |
| 2,327,722 | Kouyoumjian | Aug. 24, 1943 |
| 2,358,371 | Wolf | Sept. 19, 1944 |
| 2,405,250 | Wolf | Aug. 6, 1946 |